(12) United States Patent  (10) Patent No.: US 7,854,214 B2
Khubani et al.  (45) Date of Patent: Dec. 21, 2010

(54) PET GROOMING TOOL WITH PIVOT HEAD AND ROTATABLE BLADE

(75) Inventors: Ashok Khubani, Fairfield, NJ (US); Jason Biziak, Fairfield, NJ (US)

(73) Assignee: Ontel Products Corp., Fairfield, NJ (US)

( * ) Notice: Subject to any disclaimer, the term of this patent is extended or adjusted under 35 U.S.C. 154(b) by 608 days.

(21) Appl. No.: 11/977,014

(22) Filed: Oct. 23, 2007

(65) Prior Publication Data

US 2009/0101076 A1   Apr. 23, 2009

(51) Int. Cl.
*A01K 13/00* (2006.01)

(52) U.S. Cl. ............... 119/625; 119/627; 119/652

(58) Field of Classification Search ............... 119/625, 119/602, 608, 611, 612, 617, 619, 627, 652
See application file for complete search history.

(56) References Cited

U.S. PATENT DOCUMENTS

| 820,292 | A | * | 5/1906 | Dunbar | 403/4 |
| 851,567 | A | * | 4/1907 | Sutherland | 132/150 |
| 1,663,078 | A | * | 3/1928 | Harper | 132/118 |
| 3,308,500 | A | * | 3/1967 | Woodruff | 15/369 |
| 3,421,171 | A | * | 1/1969 | Tsuruzawa | 15/172 |
| 4,788,735 | A | * | 12/1988 | Fuk Fan | 15/172 |
| 4,970,990 | A | | 11/1990 | Wilhelmi | |
| D327,368 | S | * | 6/1992 | Zierhut | D4/121 |
| 5,339,840 | A | * | 8/1994 | Koppel | 132/151 |
| 5,353,817 | A | * | 10/1994 | Kantor et al. | 132/219 |
| 5,462,018 | A | * | 10/1995 | Louison | 119/626 |
| 5,509,378 | A | * | 4/1996 | Kimura | 119/601 |
| 6,006,393 | A | * | 12/1999 | Lynch et al. | 15/144.1 |
| 6,782,846 | B1 | | 8/2004 | Porter et al. | |
| 6,955,137 | B2 | * | 10/2005 | Dunn et al. | 119/625 |
| 7,353,777 | B2 | * | 4/2008 | Morosin et al. | 119/612 |
| 2007/0084416 | A1 | * | 4/2007 | Liao | 119/625 |

* cited by examiner

*Primary Examiner*—Yvonne R. Abbott
(74) *Attorney, Agent, or Firm*—Robert L. Epstein; Epstein Drangel LLP

(57) ABSTRACT

The pet grooming tool includes a handle and a head. The head consists of a lower head portion and an upper head portion. A toothed uni-directional blade is mounted on and extends from the lower head portion. The head portions are rotatably connected so that the tool can be used in either direction. The head is pivotally connected to the handle such that the angle between the blade and the handle can be adjusted.

12 Claims, 4 Drawing Sheets

PET GROOMING TOOL WITH PIVOT HEAD AND ROTATABLE BLADE

BACKGROUND OF THE INVENTION

1. Field of the Invention

The present invention relates to pet grooming tools and more particularly to a pet grooming tool for removing loose hair or fur from the coat of an animal having a handle and a head with uni-directional toothed blade, wherein the blade is rotationally connected to the handle so that the tool can be used by movement in either direction relative to the coat of the animal and the head is pivotally mounted on the handle so that the head can be tilted relative to the handle to adjust the angle of the blade relative to the handle.

2. Description of Prior Art Including Information Disclosed Under 37 CFR 1.97 and 1.98

Animals such as dogs and cats have coats of hair or fur that require periodic grooming to eliminate matting and to remove loose hair or fur. Such tools commonly use metal or hard rubber blades, bristles, combs or teeth extending from a head attached to a handle.

For example, U.S. Pat. No. 4,970,990 issued Nov. 20, 1990 to Wilhelmi discloses a device for removing mats from the hair of animals that consists of a handle from which a plurality of parallel spaced blades extend. The blades have tines designed to rake the uncut hair into strips and remove the cut hair. Because of the structure of the blades, the device can be moved in only one direction relative to the coat of the animal. Since the blades are fixed on the handle, in order to switch direction, the device itself must be released and rotated relative to the hand of the user.

U.S. Pat. No. 6,782,846 issued Aug. 31, 2004 to Porter relates to a pet grooming tool for removing loose hair from a furry pet that utilizes a uni-directional toothed blade fixedly secured to the head, in a plane perpendicular to the axis of the handle. To use the Porter device, one must pull the handle in a direction along the axis of the handle while the head is in engagement with the pet, causing the blade to engage the loose hair of the pet and pull it from the pet. Thus, the Porter device is very restricted in its manner of use.

The present invention is an improvement over prior art devices. While it too utilizes a toothed blade that can be used in only one direction, the blade can be rotated relative to the handle such that the tool itself can be used in either direction. Further, the head can pivot relative to the handle, between an acute angle and an obtuse angle, such that the tool is much more comfortable to use.

It is, therefore, a prime object of the present invention to provide a pet grooming tool with a uni-directional toothed blade for removing loose hair or fur from the coat of an animal.

It is another object of the present invention to provide a pet grooming tool with a uni-directional toothed blade that is connected to rotate relative to a handle such that the tool can be used in either direction.

It is another object of the present invention to provide a pet grooming tool with a toothed blade mounted on a head that is connected to pivot relative to a handle, such that the position of the blade can vary between an acute angle and an obtuse angle relative to the handle axis.

It is another object of the present invention to prove a pet grooming tool with a toothed blade situated on a head that is pivotally connected to a handle to vary the angle between the blade and the handle and has a mechanism to lock the head at the desired angle.

BRIEF SUMMARY OF THE INVENTION

In general, the above objects are achieved by the pet grooming tool of the present invention which includes a handle and a head. The head consists of a lower head portion and an upper head portion. Toothed uni-directional blade means are mounted on and extend from the lower head portion. Means are provided for rotatably connecting the head portions. Means are also provided for pivotally connecting the head and the handle.

The means for pivotally connecting the upper head portion and the handle include spaced gear teeth fixed on the upper head portion. Means for engaging the gear teeth are provided, as are means for mounting the engaging means on the handle for movement between a first position, wherein the gear teeth are engaged and the head is locked in its angular position by the engaging means and a second position, wherein the engaging means is remote from the gear teeth, disengaging the gear teeth to permit the head to pivot relative to the handle.

Preferably, the engaging means is slidably mounted on the handle and provides a means for locking the head portion in a selected angular position relative to the handle.

The head can be pivoted relative to the handle between a first angular position wherein the axis of the blade forms an obtuse angle with the handle and a second angular position wherein the axis of the blade forms an acute angle with the handle.

The means for connecting the lower head portion and the upper head portion for linear movement includes a shaft extending between and connecting the lower head portion and the upper head portion. A spring associated with the shaft is provided for urging the lower head portion towards the proximate position.

The means for rotatably connecting the head portions includes means for connecting the lower head portion and the upper head portion for linear movement between a position in which the head portions are proximate each other and a position wherein the head portions are remote from each other.

The means for connecting the head portions for linear movement also includes means for preventing relative rotational movement between the head portions when the lower head portion is in its linear position proximate the upper head portion.

The means for preventing relative rotational movement between the head portions includes a protrusion on one of the head portions and a protrusion-receiving recess on the other of the head portions.

BRIEF DESCRIPTION OF THE SEVERAL VIEWS OF DRAWINGS

To these and to such other objects that may hereinafter appears, the present invention relates to a pet grooming tool with a pivot head and rotatable blade, as described in detail in the following specification and recited in the annexed claims, taken together with the accompanying drawings, in which like numerals refer to like parts and in which:

DETAILED DESCRIPTION OF THE INVENTION

Figure 1:
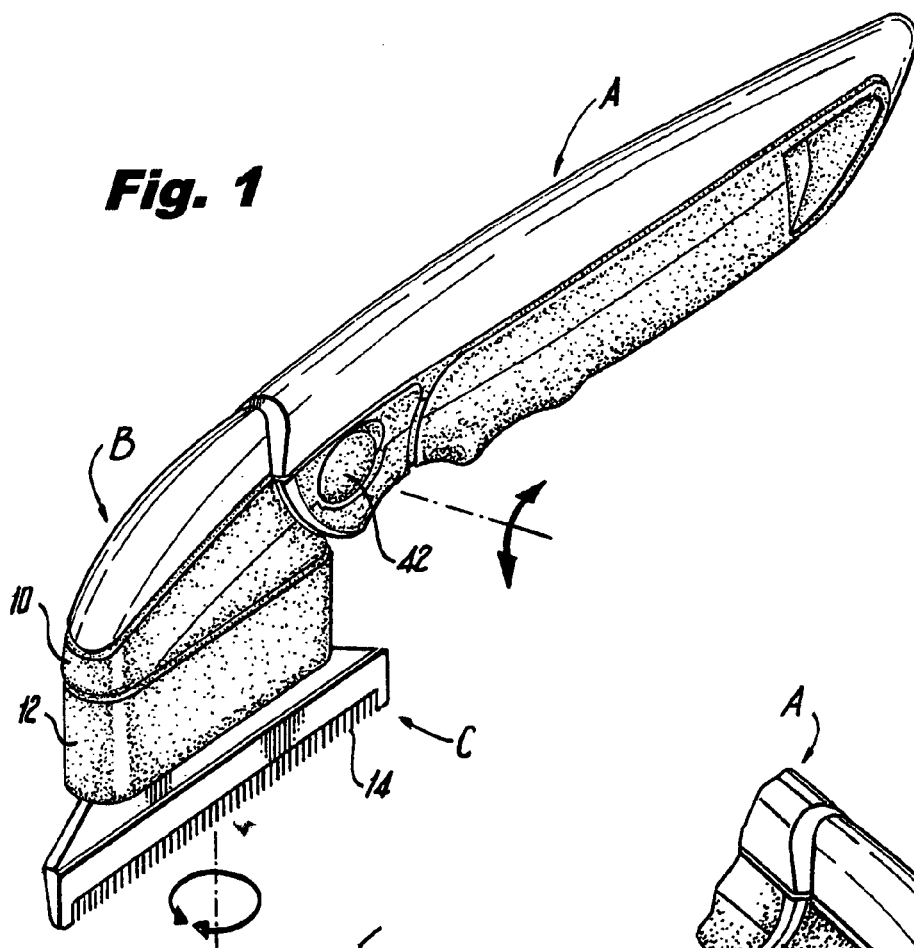
FIG. 1 is an isometric view of the pet tool of the present invention.

As illustrated in the drawings, the present invention relates to a pet grooming tool including a handle, generally designated A, and a head, generally designated B. Head B includes a upper head portion 10 and a lower head portion 12.

A blade, generally designated C, is mounted on and extends from the lower head portion 12. Blade C has a plurality of spaced teeth 14 situated along its exposed edge. Because of the configuration of teeth 14, blade C is uni-directional. That is, the blade can function as intended to remove loose hair or fur only when it is moved relative to the coat of the animal being groomed in a single direction.

Means, generally designated D, are provided for rotatably connecting the upper head portion 10 and the lower head portion 12. Means, generally designated E, are provided for pivotally connecting the upper first head portion 10 and handle A.

Figure 2:
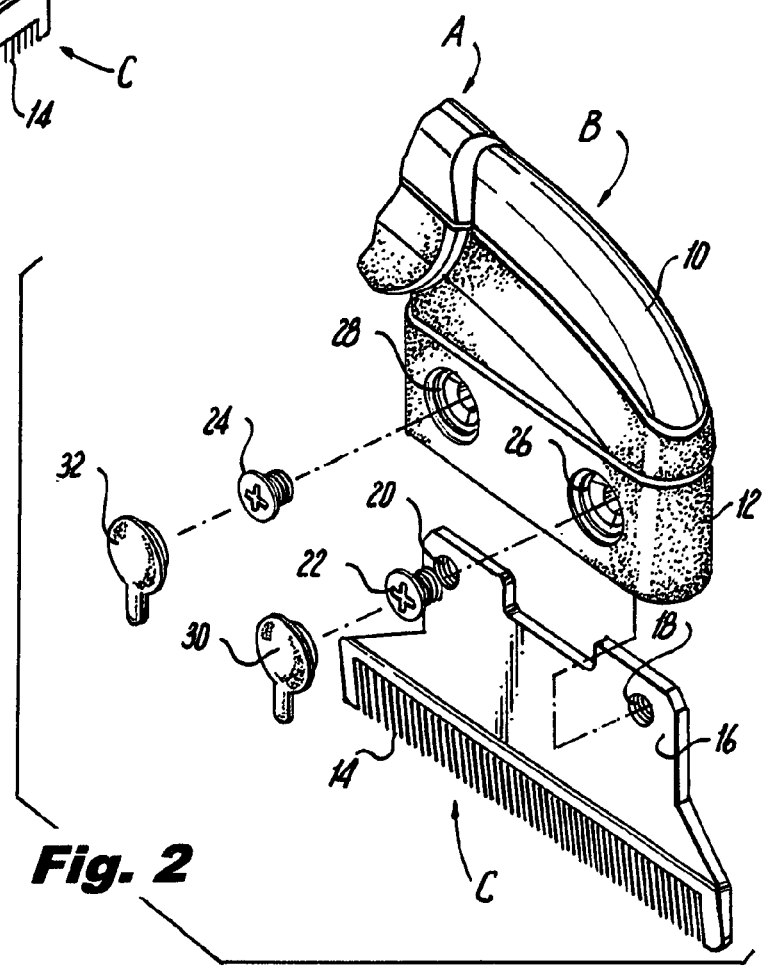
FIG. 2 is an isometric view of the head of the pet tool with the blade exploded.

As is illustrated in FIG. 2, blade C includes a base 16. Teeth 14 extend from the bottom edge of base 16. The upper section of base 16 has spaced opening 18, 20 through which screws 22, 24 extend. Screws 22, 24 are received in internally threaded recesses 26, 28, respectively, on the interior wall of head portion 12 so as to secure the blade to the head. Caps 30, 32 snap-fit into the spaced openings 26, 28, respectively, to cover the screw heads.

Figure 3:
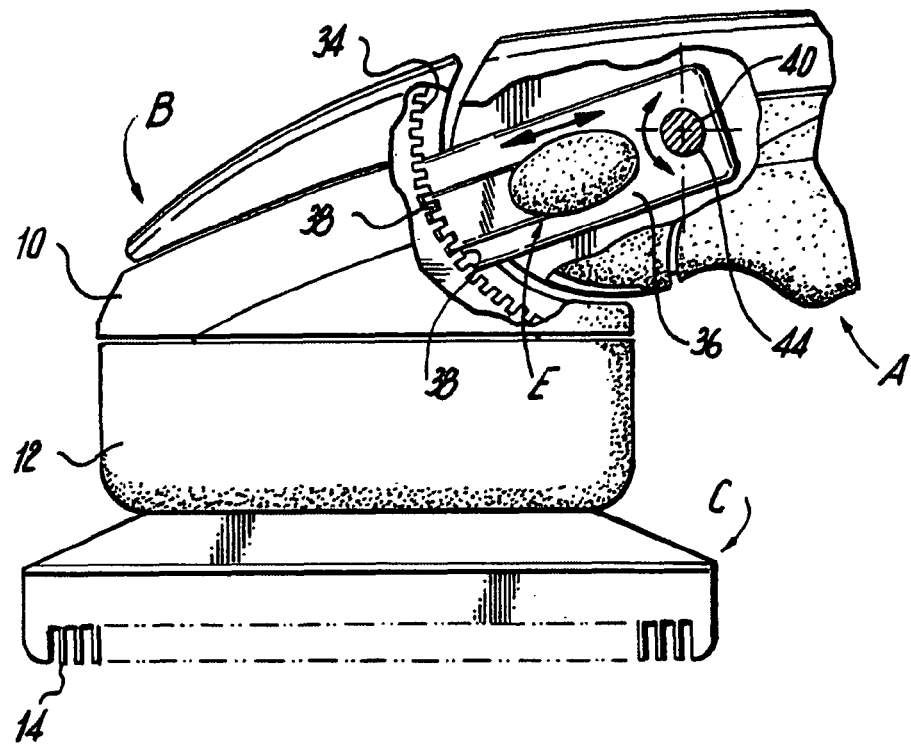
FIG. 3 is a plan view of the head of the tool with a portion cut-away to expose the locking mechanism.
Figure 4:
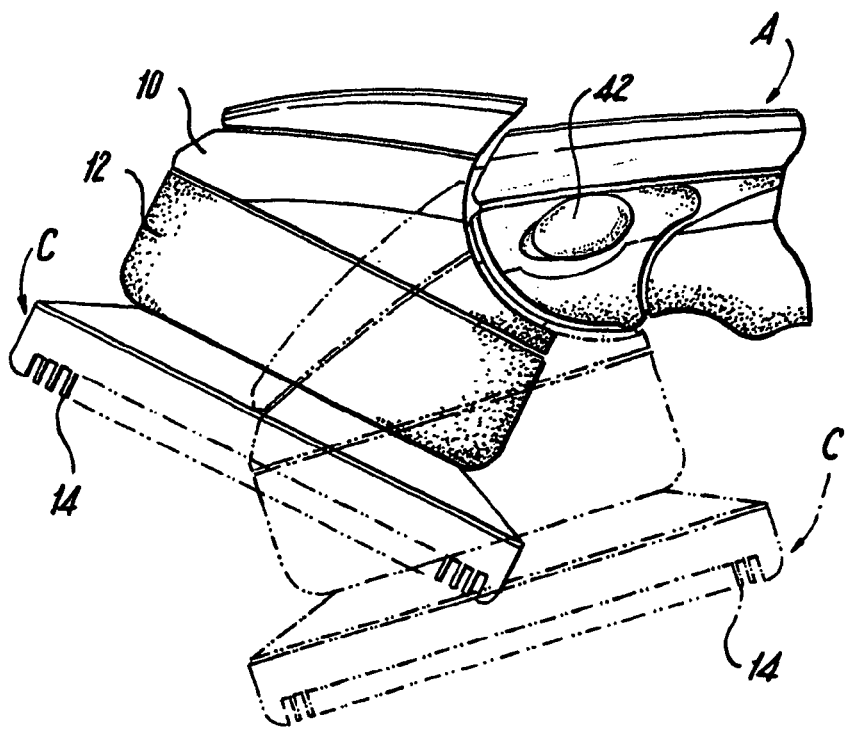
FIG. 4 is a plan view of the head of the tool showing the angular range through which the head can pivot relative to the handle.
Figure 5:
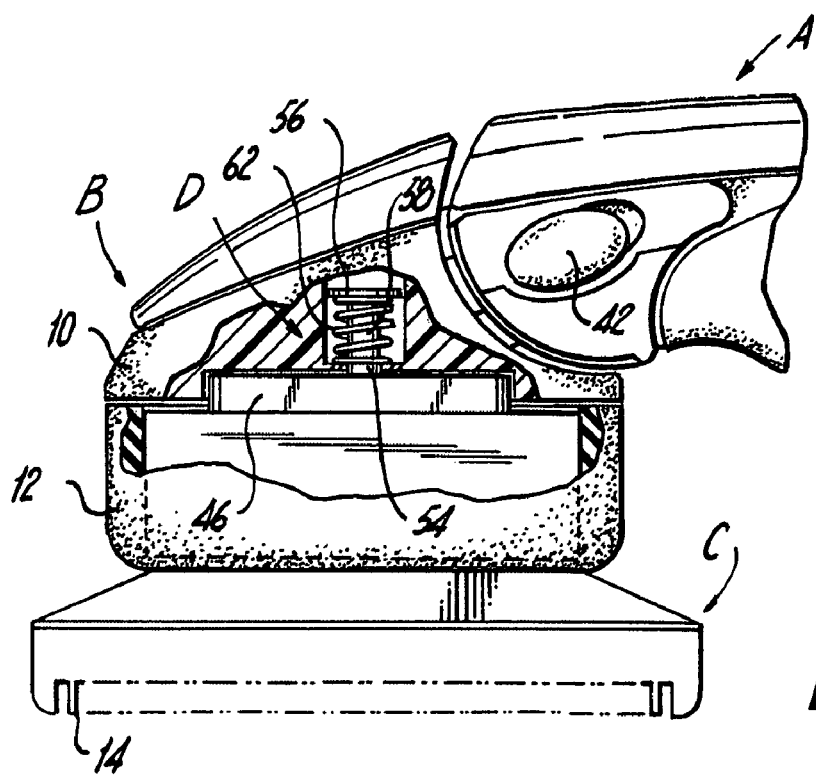
FIG. 5 is plan view of the head of the tool with a cut-away showing the connecting mechanism of the head portions, with the head portions linearly proximate each other.

The means D for pivotally connecting upper head portion 10 and handle B is best seen in FIGS. 3 and 4. That means includes an arcuate set of spaced gear teeth 34 fixed on a shoulder within upper head portion 10. A generally "U" shaped slide 36 is provided to lock the head in position relative to the handle.

Slide 36 has spaced legs with teeth 38 formed at the end of each leg. Slide 36 is moveable between a lock position, shown in FIG. 3, wherein teeth 38 engage gear teeth 34 such that head B is retained in position relative to handle A, and a release position, illustrated in FIG. 4, wherein teeth 38 are remote from and disengage teeth 34, such that head B can pivot freely relative to handle A about a shaft 40 to permit adjustment of the angle between the head and handle.

Slide 36 is moved between lock and release positions by manipulating button 42 which is accessible from the exterior of handle A. Slide 36 is spring loaded toward its lock position by an internal spring (not shown). When button 42 is moved from the forward position (FIG. 3) to the rear position (FIG. 4) against the action of the spring, slide 36 moves from the lock position to the release position, and the angular position of the head relative to the handle can be adjusted, as illustrated in FIG. 4. Once the head is in the desired position, button 42 is released and the spring urges slide 36 back into the lock position.

The body portion of slide 36 is provided with an elongated slot (not shown) through which shaft 40 extends. The elongated shape of the slot permits the slide to move between its lock and release positions without interference from the shaft. Shaft 40 has an enlarged head 44, the diameter of which is larger than the width of the slot. That slot, along with guides (not shown) retain the slide in a plane aligned with teeth 34, as it is moved.

Accordingly, when slide 36 is in the release position, head B can be pivoted relative to handle A between an angular position wherein blade C forms an obtuse angle with the axis of handle A (shown in solid in FIG. 4) and an angular position wherein blade C forms an acute angle with handle A (shown in phantom in FIG. 4).

FIGS. 5-9 illustrate the means for rotatably connecting upper head portion 10 and lower head portion 12. That means includes an upwardly directed member 46 elongated along the axis of lower head portion 12 and extending from surface 48 thereof toward upper head portion 10. The lower surface 50 of upper head portion 10 has an elongated recess 52 of approximately the same shape and size as member 46.

A pin 54 with an enlarge head 56 and a shaft 58 is moveably mounted within a channel 60 in upper head portion 10. The lower portion of shaft 58 extends through a small opening in surface 50. The end of shaft 58 is fixed to the upper surface of member 46.

Figure 6:
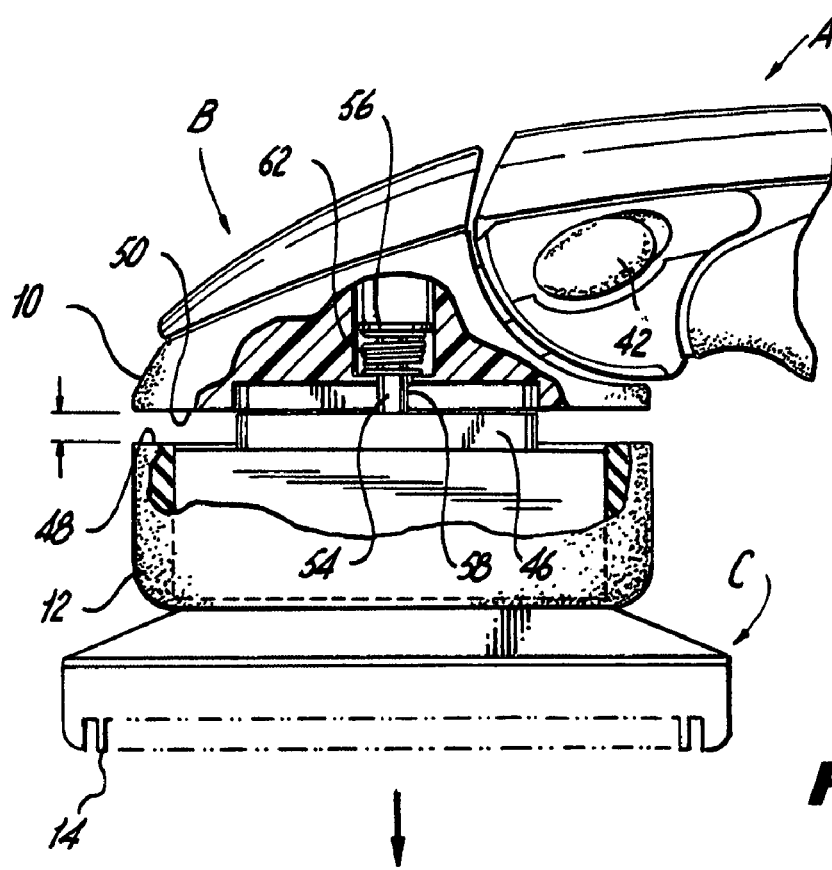
FIG. 6 is plan view of the head of the tool with a cut-away showing the connecting mechanism of the head portions, with the head portions linearly remote from each other.

A spring 62 is situated around shaft 58, between head 56 and surface 50. Spring urges pin 54 towards the position shown in FIG. 5, wherein lower head portion 12 is proximate upper head portion 10, with member 46 seated within recess 52. When lower head portion 12 is moved away from upper head portion 10, as is illustrated in FIG. 6, spring 62 is compressed and member 46 is moved out of recess 52.

Thus, lower head portion 12 is connected to upper head portion 10 in a manner that permits linear movement between the head portions, and more particularly, between a position in which lower head portion 12 is proximate upper head portion 10, member 46 is seated in recess 52, and thus rotational movement between the head portions is prevented, and a position wherein lower head portion 12 is remote from upper head portion 10, member 46 is outside of recess 52 and thus rotation about an axis defined by shaft 58 between the head portions is possible. Spring 62 normally urges lower head portion 12 towards upper head portion 10 and hence toward the position where rotation is prevented.

Figure 7:
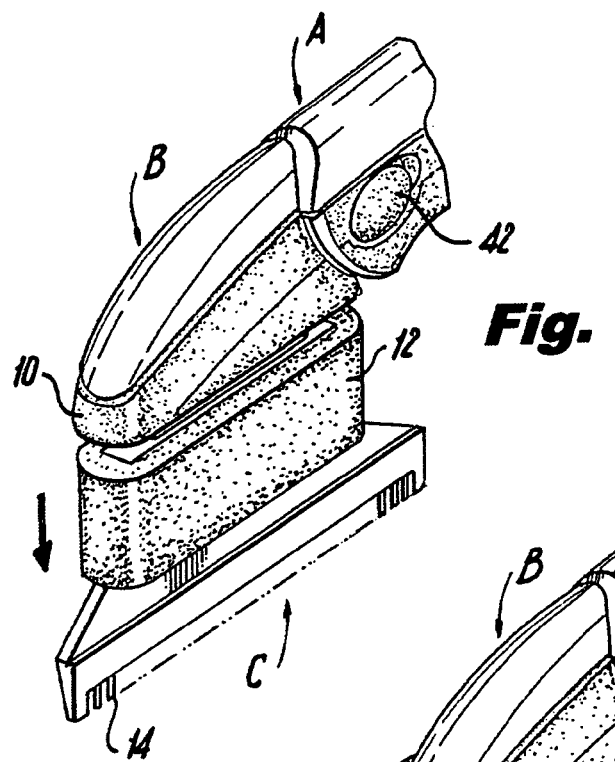
FIG. 7 is an isometric view of the head portion of the tool with the lower head portion in the remote linear position.
Figure 8:
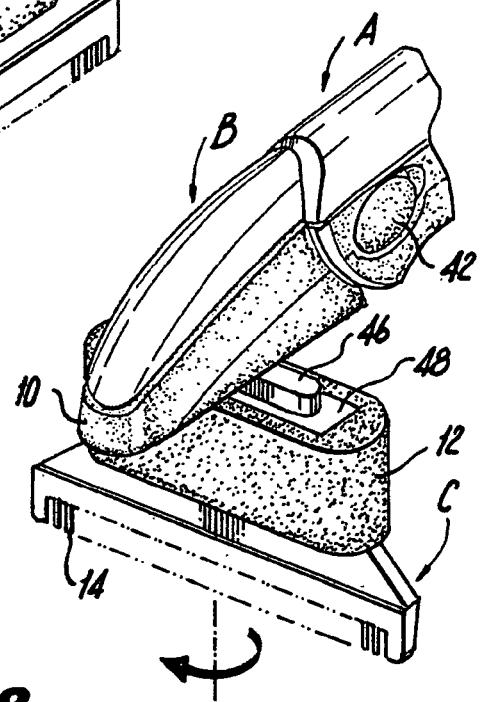
FIG. 8 is an isometric view of the head portion of the tool with the lower head portion in the remote linear position and rotated ninety degrees relative to the handle axis.
Figure 9:
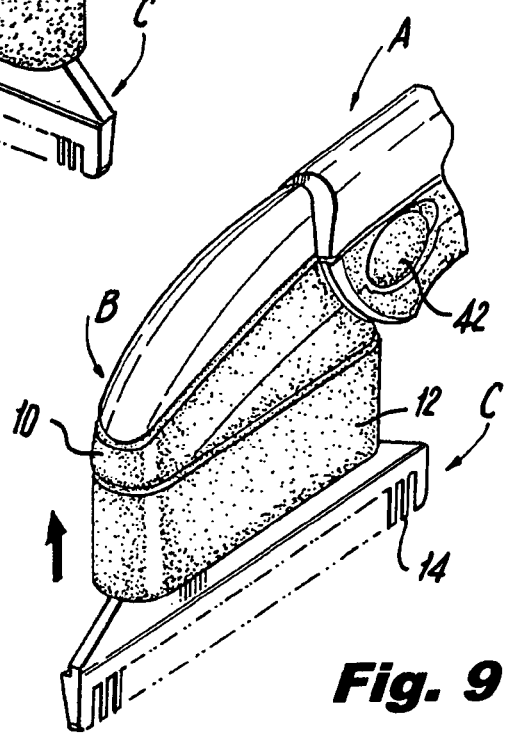
FIG. 9 is an isometric view of the head portion of the tool with the lower head portion rotated 180 degrees from its original position, and in the proximate linear position.

In order to change the direction of the blade, lower head portion 12 is rotated relative to upper head portion 10, as illustrated in FIGS. 7, 8 and 9, by linearly moving lower head portion 12 away from upper head portion 10, against the action of spring 62. Lower head portion 12 is rotated relative to upper head portion 10 through an arc of 180 degrees, such that member 46 again aligns with recess 52. Lower head portion 12 is then released and spring 62 will bring lower head portion 12 back to a position proximate upper head portion 10, with member 46 again seated within recess 52.

It will now be appreciated that the present invention relates to a pet grooming tool which includes a handle and a head. The head consists of two head portions. A uni-directional toothed blade is mounted on and extends from the lower head portion. Means are provided for rotatably connecting the head portions such that the blade can be turned to face either direction, relative to the handle.

Means are also provided for pivotally connecting the head and the handle. The head can be pivoted relative to the handle between a first angular position, wherein the axis of the blade forms an obtuse angle with the handle, and a second angular position, wherein the axis of the blade forms an acute angle with the handle.

The means for rotatably connecting the head portions includes means for connecting the head portions for linear movement between a rotation-preventing position in which the lower head portion is proximate the upper head and a rotation position wherein the lower head portion is remote from the upper head portion.

The means for connecting the head portions for linear movement includes a shaft extending between and connecting the head portions. Means associated with the shaft are provided for urging the lower head portion towards the proximate position.

While only a single preferred embodiment of the present invention has been disclosed for purposes of illustration, it is obvious that many modifications and variations could be made thereto. It is intended to cover all of those modifications and variations which fall within the scope of the present invention, as defined by the following claims.

We claim:

1. A pet grooming tool comprising: a handle and a head, said head comprising a first head portion and a second head portion; a toothed blade mounted on and extending from said second head portion; means for rotatably connecting said head portions, and means for pivotally connecting said head and said handle.

2. The tool of claim 1 wherein said blade is uni-directional.

3. A pet grooming tool comprising: a handle and a head, said head comprising a first head portion and a second head portion; a toothed blade mounted on and extending from said second head portion; means for rotatably connecting said head portions, and means for pivotally connecting said head and said handle, wherein said means for pivotally connecting said head and said handle comprises a set of gear teeth fixed on said head, means for engaging said gear teeth and means for mounting said engaging means on said handle for movement between a first position wherein said gear teeth are engaged by said engaging means and a second position wherein said gear teeth are disengaged by said engaging means.

4. The tool of claim 3 wherein said engaging means is slidably mounted on said handle.

5. A pet grooming tool comprising: a handle and a head, said head comprising a first head portion and a second head portion; a blade mounted on and extending from said second head portion; means for rotatably connecting said head portions, and means for pivotally connecting said head and said handle, further comprising means for locking said head in a selected angular position relative to said handle.

6. A pet grooming tool comprising: a handle and a head, said head comprising a first head portion and a second head portion; a blade mounted on and extending from said second head portion; means for rotatably connecting said head portions, and means for pivotally connecting said head and said handle, wherein said head can be pivoted relative to said handle between a first angular position wherein said blade forms an obtuse angle with said handle and a second angular position wherein said blade forms an acute angle with said handle.

7. A pet grooming tool comprising: a handle and a head, said head comprising a first head portion and a second head portion; a blade mounted on and extending from said second head portion; means for rotatably connecting said head portions, and means for pivotally connecting said head and said handle, wherein said means for rotatably connecting said head portions comprises means for connecting said head portions for linear movement between a position in which said head portions are proximate each other and a position wherein said head portions are remote from each other.

8. The tool of claim 7 wherein said means for connecting said head portions for linear movement comprises a shaft extending between said head portions and means associated with said shaft for urging said head portions towards said proximate linear position.

9. The tool of claim 8 wherein said urging means comprises a spring surrounding said shaft.

10. The tool of claim 7 wherein said means for connecting said head portions for linear movement further comprises means for preventing relative rotational movement between said head portions when said head portions are in said proximate linear position.

11. The tool of claim 10 wherein said means for preventing relative rotational movement between said head portions comprises a member protruding from one of said head portions and a protrusion-receiving recess on the other of said head portions.

12. The tool of claim 7 wherein said blade is uni-directional.

* * * * *